United States Patent Office 3,071,568
Patented Jan. 1, 1963

3,071,568
POLYMERIC COMPOSITIONS
John A. Price, Swarthmore, Pa., assignor to American Viscose Corporation, Philadelphia, Pa., a corporation of Delaware
No Drawing. Filed Jan. 8, 1960, Ser. No. 1,191
3 Claims. (Cl. 260—93.7)

This invention relates to new compositions of matter, and is particularly directed to polymers of 3,7-dimethyl-1-octene and 4,6,6-trimethyl-1-heptene, and to novel chemical compounds useful as intermediates in the manufacture of the polymers.

I have discovered that 3,7-dimethyl-1-octene and 4,6,6-trimethyl-1-heptene may be polymerized in the presence of a coordination complex catalyst and in the presence of an inert saturated hydrocarbon solvent such as hexane, heptane, or isooctane to solid polymers characterized by crystalline melting points in excess of 280° C., and by complete solubility in hydrocarbon solvents. The combination of high melting point and hydrocarbon solubility would appear to be most unexpected, since the closely related homologous monomer, 3,5,5-trimethyl-1-hexene polymerizes to a hydrocarbon-insoluble polymer, as disclosed in my copending application S.N. 1,190, filed January 8, 1960, now Patent No. 3,010,951 issued November 28, 1961. The polymers of the present invention are particularly useful as coating materials in applications where the coating is to be subjected to elevated temperatures, for example as a coating material for the windings of electrical motors which are to be used in high temperature service. The coating may be easily applied by dissolving the polymer in a hydrocarbon solvent and spraying or painting the solution on the surface to be coated. On evaporation of the solvent a firm, tough, impervious coating is left on the surface of the article.

The term "coordination catalyst" when used in the specification and claims means a catalyst composed of the reaction product of a halide of a metal of groups IVa, Va and VIa of the periodic system and a reducing agent such as a metal hydride or an organometallic compound of a metal of groups Ia, IIb and IIIb of the periodic table. Particularly useful catalyst systems comprise a titanium halide and an organo-aluminum compound, such as $TiCl_4$—$Al(C_4H_9)_3$; $TiCl_3$—$Al(C_2H_5)_3$; $TiCl_4$—$Al(C_2H_5)_2Cl$; $TiCl_3$—$AlC_2H_5Cl_2$—$Al(C_2H_5)_3$ and the like. Preferably, the Al/Ti mol ratio is from 1:1 to 6:1. By "crystalline melting point" I mean the temperature at which birefringence disappears when the polymer is viewed through a polarizing microscope. Melting points so determined are not strictly reproducible, and may vary from 10° C. to 15° C. on the same sample.

The monomers used as a starting material in the preparation of my new polymers may be prepared by acetate pyrolysis of the corresponding primary alcohol. The alcohol may in turn be prepared by various methods, such as the reaction of formaldehyde with a Grignard reagent derived from 1-chloro-3,5,5-trimethyl hexane. Other methods of preparation may also be used. For example, the hitherto unknown 4,6,6-trimethyl-1-heptanol was prepared by the following procedure.

A 3-liter, 3-neck flask was equipped with a stirrer, thermometer, reflux condenser, and addition funnel. The flask was charged with 80 grams of magnesium turnings and a crystal of iodine and then the flask and assembly were flamed with a bunsen burner for ten minutes while purging with nitrogen. Three hundred milliliters of dry ether was then added to the cooled flask and 500 g. of 1-chloro-3,5,5-trimethylhexane diluted with 1000 ml. of dry ether was slowly added, with stirring, over a period of 4 hours while maintaining a reflux temperature. After the addition of 1-chloro-3,5,5-trimethylhexane was completed, heating was continued for another hour at reflux temperature.

100 grams of paraformaldehyde was then heated and vaporized into the flask over a period of 100 minutes, the temperature being maintained at 17–35° C. The reaction mixture was then stirred and refluxed for an additional 40 minutes, then cooled to 25° C., and poured into a liter of ice and water.

The resulting precipitate was dissolved with 325 ml. of iced 37% HCl. The ether layer was separated and the aqueous layer was extracted with three 200 ml. portions of ether. The ether fractions were combined and distilled to yield 307 grams of 4,6,6-trimethyl-1-heptanol, boiling at 108–110° C. at 20 mm., and having a refractive index $n_D^{20} 1.4344$.

The 4,6,6-trimethyl-1-heptanol was then mixed with five mols of acetic anhydride and one mol of acetic acid per mol of alcohol and the resulting solution was refluxed for 8 hours. The solution was then cooled to 25° C., poured into an equal volume of water, and allowed to stand overnight. The aqueous layer was then separated, and the ester layer was washed with water and sodium bicarbonate solution, and dried. Upon distillation, 4,6,6-trimethyl-1-heptyl acetate having a boiling range of 97–101° C. at 10 mm. and a refractive index of $n_D^{20} 1.4245$ was recovered.

The acetate was then pyrolyzed by dripping it in an atmosphere of nitrogen at a rate of 30–40 ml. per hour through a 30 mm. Vycor tube, 80 cm. long, packed with ⅛″ glass helices heated to 450–500° C. From the pyrolyzate the hitherto unknown 4,6,6-trimethyl-1-heptene, having a boiling range of 143–145° C., was recovered by distillation.

3,7-dimethyl-1-octene was prepared in an identical manner, except that 3,7-dimethyl-1-octanol, commercially available, was used as a starting material.

These two monomers may be readily polymerized to high melting polymers soluble in hydrocarbon solvents as shown in the following examples.

Example I

A reaction vessel was purged with nitrogen and charged with 100 ml. of heptane, 6.8 ml. of aluminum triisobutyl, and 2.8 ml. of titanium tetrachloride. 40 grams of 4,6,6-trimethyl-1-heptene was added to the catalyst slurry and the resultant slurry was stirred and refluxed for 19 hours. The slurry was cooled to room temperature, treated with 100 ml. of isopropanol to deactivate the catalyst, and heated again to reflux temperature for 15 minutes in order to dissolve catalyst residues.

The polymer formed was collected on a sintered glass funnel and washed with 100 ml. of isopropanol. It was then washed with three 100 ml. portions of a solution containing 200 ml. of methanol and 100 ml. of 18% hydrochloric acid. It was finally washed with three 100 ml. portions of methanol and dried overnight in a vacuum oven at 55° C. 15.5 grams of a dry, white, powdery polymer were recovered. The polymer was completely soluble in heptane at 25° C., and had a crystalline melting point of 295° C.

Example II

A glass reaction vessel was flamed with a bunsen burner while purging with nitrogen and then charged, after cooling, with 100 ml. of heptane, 6.8 ml. of aluminum triisobutyl, and 1.8 ml. of titanium tetrachloride. The catalyst suspension was heated to 48° C. and 52 grams of 3,7-dimethyl-1-octene was added with stirring over an 8 minute period. The resulting slurry was heated to reflux where it was maintained for 5 hours. It has then cooled and treated with 100 ml. of isopropanol. The solid polymer was collected on a funnel and washed in the same manner as described in Example I. The dried white powdery polymer weighed 11 grams, was soluble in heptane at 25° C., and had a crystalline melting point of 280–285° C.

The invention claimed is:

1. As a new composition of matter, a polymer of a monomer selected from the group consisting of 4,6,6-trimethyl-1-heptene and 3,7-dimethyl-1-octene, said polymer being characterized by having a crystalline melting point of approximately 280–295° C., and by being soluble in hydrocarbon solvents at a temperature of 25° C.

2. Poly(4,6,6-trimethyl-1-heptene), characterized by having a crystalline melting point of approximately 295° C. and by being soluble in hydrocarbon solvents at a temperature of 25° C.

3. Poly(3,7-dimethyl-1-octene), characterized by having a crystalline melting point of approximately 280–285° C., and by being soluble in hydrocarbon solvents at a temperature of 25° C.

References Cited in the file of this patent

UNITED STATES PATENTS

| | | |
|---|---|---|
| 2,792,417 | Dean | May 14, 1957 |
| 2,806,887 | Surmatis | Sept. 17, 1957 |
| 2,828,296 | Guillet | Mar. 25, 1958 |
| 2,836,628 | Miller | May 27, 1958 |
| 2,842,532 | Campbell | July 8, 1958 |
| 2,954,367 | Vandenberg | Sept. 27, 1960 |
| 2,962,488 | Horne | Nov. 29, 1960 |

OTHER REFERENCES

Chemical Abstracts, vol. 51 page 15393(d) (1957).

Gaylord and Mark "Linear and Stereoregular Addition Polymers" Interscience Publishers, New York (June 1959) pp. 484–500.